R. S. SHERWIN.
METHOD OF PRECIPITATING ALUMINUM HYDRATE.
APPLICATION FILED JULY 16, 1913.
1,251,296.
Patented Dec. 25, 1917.
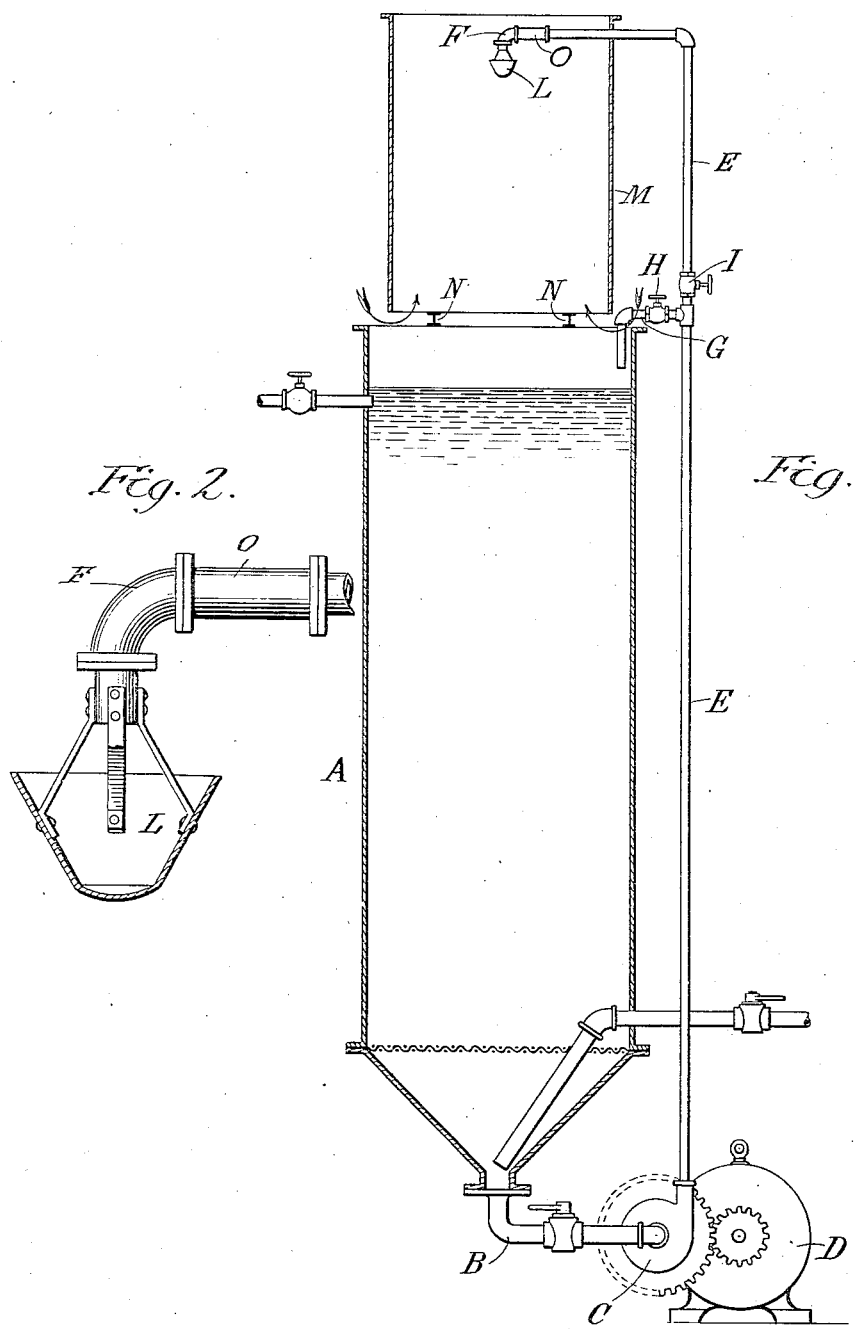

UNITED STATES PATENT OFFICE.

RALPH S. SHERWIN, OF EAST ST. LOUIS, ILLINOIS, ASSIGNOR TO ALUMINUM COMPANY OF AMERICA, OF PITTSBURGH, PENNSYLVANIA, A CORPORATION OF PENNSYLVANIA.

METHOD OF PRECIPITATING ALUMINUM HYDRATE.

1,251,296.  Specification of Letters Patent.  Patented Dec. 25, 1917.

Application filed July 16, 1913. Serial No. 779,327.

*To all whom it may concern:*

Be it known that RALPH S. SHERWIN, residing at East St. Louis, county of St. Clair, and State of Illinois, have invented certain new and useful Improvements in Methods of Precipitating Aluminum Hydrate, of which the following is a full, clear, and exact description.

The invention which constitutes the subject-matter of this application relates to an improved method of precipitating aluminum hydrate.

One of the methods now in vogue in the precipitation of aluminum hydrate from the solution commonly known in the art as sodium aluminate liquor, consists in establishing a column of the liquor from which the hydrate is to be precipitated and in which is contained a quantity of precipitated hydrate in the form of particles, withdrawing precipitated hydrate from the lower part of the column and returning it to the upper part thereof, and continuing such withdrawal and return of hydrate while maintaining the column free from violent agitation, whereby the precipitate collects in the lower portion of the column and is withdrawn therefrom with a minimum quantity of the liquor. The older method practised consists, *inter alia*, in subjecting the liquor to agitation, more or less violent, by means of paddles, beaters, or similar devices working in the liquor, the prevalent belief being that more or less violent agitation was essential to accomplish the precipitation of the hydrate.

The method herein described is an improvement upon the prior methods in that it effects the precipitation of more aluminum hydrate from the liquor, in the same interval of time. The reactions in the liquor are accompanied by the liberation of considerable heat and as a result, the temperature of the liquor may reach a point where it seriously affects the rate of precipitation, especially in large units, in which the radiating surface of the apparatus is less in proportion to the cubic contents of the tank. Consequently, the precipitation of aluminum hydrate in large containers may be carried on more economically if the aluminate liquor be subjected to a cooling process while undergoing such precipitation. Availing myself of this fact, I have been led to devise my present invention, which has for its chief object to provide an improved method for the precipitation of aluminum hydrate which includes the novel cooling of the aluminate liquor containing solid matter in suspension.

In practising my method in the preferred manner the necessary suspension of the particles in the column of liquor may be effected in the usual way. The precipitate is then frequently or continuously withdrawn from the bottom of the tank in which the precipitation occurs, exposed to a cooling action preferably by contact with the atmospheric air, and delivered to the column of liquor at or near the top in the form of a thin sheet or fine spray, whereby the same is cooled as it falls from a suitable sprayer or rose as a saucer to the said column of liquor. One of the great difficulties encountered in reintroducing the precipitated liquor at the top of the tank, resides in the fact that owing to the viscous properties of the liquor the same would foam and spill over the upper edge of the tank. To minimize this foaming of the liquor, according to the present practice, some of the liquor containing precipitated hydrate withdrawn from the bottom of the tank is discharged at the upper end thereof slightly below the upper surface of the liquor. I have ascertained, however, that by reintroducing the liquor containing precipitated hydrate above the upper surface of the column of liquor while such reintroduced portion is in a disintegrated form, that is to say, in the form of a fine spray, or in the form of a thin sheet, this difficulty of foaming is completely overcome. I have also found that by breaking up the stream which discharges into the column of liquor, into minute particles whereby the same is exposed to the atmospheric air, a cooling of the liquor containing precipitated hydrate takes place, which hastens to a maximum the precipitation of the aluminum hydrate from the liquor in the precipitator. One of the many forms of apparatus by which the method may be practised is illustrated in the accompanying drawings, Figure 1 being a longitudinal vertical section of the precipitating tank with the cooler secured to the upper end thereof, Fig. 2 being a detail view of the distributer.

The vertical cylindrical tank A, which contains the sodium aluminate liquor, is provided with a conical or hopper bottom to the apex of which is connected a pipe B leading to the centrifugal pump C driven by a motor D to which it is geared. From the pump a circulating pipe E extends upwardly alongside the tank to a point above the surface of the liquid, then extends horizontally and terminates in an elbow F directed downwardly and located at a point above the center of the precipitator. At G I show a branch pipe provided with a valve H whereby a portion or all, as desired, (depending upon the amount of cooling necessary) of the liquor passing up the pipe E may be discharged into the column at or adjacent the upper surface thereof, as shown. Beyond the branch pipe G I employ a valve I whereby the flow of liquor to the cooler may be also controlled. A metal distributing saucer L, of suitable size and with the walls thereof at the proper angle, is set at the discharge end of the pipe so as to receive the liquor containing solid matter in suspension and to cause it to spread on all sides in a thin sheet which breaks into fine particles as it falls. A tower M, supported by I-beams N, of cylindrical or other suitable contour, according to the shape of the tank on which the apparatus is used, and with a diameter less than that of the precipitating tank, prevents the liquor discharged from the cup L from being thrown over the upper edge of the precipitator. Between the top of the precipitator and the bottom of the tower or cylinder, I provide a space to allow the air to enter and pass upwardly through the cylinder to cool the liquor discharged from the circulating pipe. The saucer which receives and spreads the liquor must be high enough above the upper surface of the column in the precipitators to cause the liquor discharged into said saucer to break up into fine particles before falling into the precipitator. If the saucer is set too close to the surface of the liquor, or if for any reason the stream of liquor does not break up sufficiently, it will cause the liquor in the tank to foam and run over the sides of the precipitator. The size and shape of the saucer L is such as to give the best and most uniform distribution of the liquor within the area inclosed by the tower, and the amount of liquor passing through the pipe E and saucer L may be varied by means of the valve I according to the rate of cooling desired, as the principle of regulating the spray depends on the fact that the distance which the liquor will be thrown from the saucer varies with the velocity with which the liquor impinges on the saucer. In order, however, to decrease the velocity at which the liquor impinges upon the saucer L, I employ a pipe O whose internal diameter is greater than the horizontal portion of the branch pipe G, it being understood that the elbow F is of substantially the same size as the pipe O. This construction is fully described and illustrated in my co-pending application, Serial No. 779,328, filed on even date herewith, to which reference is hereby made. This construction makes it possible to so set the spreader plate that the solution is spread satisfactorily regardless of the volume passing through the cooling apparatus.

While I have not yet been able to determine fully the reason for the success of the method of spraying as above described it is believed that it is due to the fact that there is enough distance between the spraying means and the surface of the liquor to allow the air bubbles to escape before the falling liquor strikes the main body of liquor in the tank and to the fact that by introducing the falling liquor in the form of a fine spray no air particles are entrapped at the surface of the column and dragged into the same as would be the case if the same were introduced in the form of streams.

While the method is described in connection with and is admirably adapted for the cooling of sodium aluminate liquor during the precipitation of alumina, it is to be understood that the invention is not limited to this particular use as the same is obviously applicable to the cooling of any liquor carrying solid matter and which is sufficiently viscous to entrain, as the same falls into the main body of liquor, an aggregation of air particles which rises to the surface of the liquid as foam.

What I claim is:—

1. The herein described methods of precipitating aluminum hydrate from an alkali aluminate solution, which consists in maintaining an amount of precipitated aluminum hydrate in suspension in a body of said aluminate solution, withdrawing more or less of the aluminum hydrate from the bottom of the column and reintroducing the same at the top thereof in the form of a thin sheet of spray exposed to the atmospheric air.

2. The herein described method of precipitating aluminum hydrate from an alkali aluminate solution, which consists in maintaining an amount of precipitated aluminum hydrate in suspension in a body of said aluminate solution, withdrawing more or less of the aluminum hydrate from the bottom of the column, then cooling and reintroducing the same at the top of said column in the form of a fine spray.

3. In the precipitation of aluminum hydrate, the improvement which consists in withdrawing the liquor containing precipitated aluminum hydrate from the bulk of such liquor and reintroducing the same through a column of atmospheric air from a point above the surface of said bulk of liquid.

4. The method of cooling an alkaline aluminate solution containing particles of aluminum hydrate in suspension, which consists in withdrawing the said solution from the container and re-introducing the same in a disintegrated form through a column of air.

5. The method of preventing foaming of a viscous solution which consists in withdrawing it from a body thereof and introducing it through a column of air into a container in the form of fine particles.

6. The process of precipitating aluminum hydrate from an alkali aluminate solution, said process comprising the step of breaking up the said solution into the form of a fine spray and passing the same in its disintegrated form through a column of air, whereby the same may be reintroduced in a column of liquor while avoiding the foaming of the same.

7. The process of precipitating aluminum hydrate from an alkali aluminate solution, said process comprising the steps of withdrawing the liquor carrying suspended aluminum hydrate from a body thereof in a container, passing the same through a cooling medium and reintroducing the same into the body of liquor in the container in the form of a fine spray.

8. The process of precipitating aluminum hydrate from an alkali aluminate solution, said process comprising the steps of maintaining a column of the aluminate solution containing a quantity of precipitated aluminum hydrate, withdrawing the aluminum hydrate from the bottom of the column, passing the same through a column of air, and reintroducing the same into the column of liquor in a disintegrated form, whereby cooling is effected and the particles of the precipitate come into intimate contact with substantially all portions of the aluminate liquor.

9. A method of precipitating alumina from an alkali aluminate solution comprising the steps of maintaining a column of substantially quiescent aluminate solution containing a quantity of precipitated aluminum hydrate, withdrawing the aluminum hydrate from the bottom of the column, cooling the same by passing it through a column of air and reintroducing it in disintegrated form at the top of the liquor column, whereby cooling is effected and in settling through the liquor the particles of the precipitate come into intimate contact with substantially all portions of the aluminate liquor.

10. The process of precipitating aluminum hydrate from an alkali aluminate solution, said process comprising the steps of withdrawing the liquor while carrying some precipitate from a container, exposing the same to the atmospheric air under conditions capable of cooling the same, and reintroducing the same into the body of liquor in the container in the form of a fine spray.

11. The method of accelerating the precipitation of aluminum hydrate, which consists in cooling the solution by withdrawing a quantity of it from a body thereof and introducing it through a column of air into a container and breaking up said falling liquor in the form of fine particles.

12. The method of preventing foaming of a viscous solution which consists in withdrawing it from a body thereof and introducing it through a column of air directly into a container in the form of fine particles.

13. The method of preventing foaming of a viscous liquid which is being discharged into a container which consists in effecting said discharge through a column of air into the container in the form of fine particles.

14. The method of accelerating the precipitation of aluminum hydrate and of preventing the foaming of liquids containing the same, which consists in cooling the solution by withdrawing a quantity of it from a body thereof and introducing it through a column of air into a container and breaking up said falling liquor into the form of fine particles.

15. The herein described process of withdrawing heat from a body of a liquor possessing a relatively great tendency to foam, which comprises withdrawing an amount of such liquor from such body, and by forming the same into a spray, at a point so far above such body of liquor that when the spray enters the body of liquor it will be in the form of small drops whereby no air bubbles will be carried into said liquor, and no foam produced.

16. A process of precipitating aluminum hydroxid from alkali aluminate solution which comprises maintaining a body of aluminate solution containing aluminum hydrate, distributed therethrough, withdrawing from the lower part of said body a stream of said liquid with suspended aluminum hydrate, reintroducing the liquid so withdrawn, at the upper part of said body, and cooling the withdrawn portion at a suitable point in its travel.

17. In the precipitation of aluminum hydroxid from a solution of alkali aluminate by maintaining precipitated aluminum hydroxid in contact with and distributed throughout the body of said liquor, the step of withdrawing from the lower part of said body of such liquor, a portion of liquor carrying precipitate, and delivering the same, through a column of air in a disentegrated form, to the upper part of said body of liquor.

18. In the treatment of a liquid prone to foaming, the step of withdrawing a portion of such liquid from a body thereof, and introducing the same, in the form of fine particles, at a point sufficiently above the surface of such body of liquor, that such introduced portion reënters the said body of liquor, as fine drops, and without carrying air into said body of liquor.

In testimony whereof I affix my signature in the presence of two subscribing witnesses.

RALPH S. SHERWIN.

Witnesses:
C. E. HODGSON,
H. P. HELMER.